(12) United States Patent
Nagano

(10) Patent No.: US 7,006,713 B1
(45) Date of Patent: Feb. 28, 2006

(54) IMAGE-PROCESSING APPARATUS AND IMAGE-DISPLAYING APPARATUS

(75) Inventor: Miki Nagano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/743,863

(22) PCT Filed: May 17, 2000

(86) PCT No.: PCT/JP00/03156

§ 371 (c)(1),
(2), (4) Date: Jan. 17, 2001

(87) PCT Pub. No.: WO00/70596

PCT Pub. Date: Nov. 23, 2000

(30) Foreign Application Priority Data

May 17, 1999 (JP) ................................. 11-135320

(51) Int. Cl.
*G06K 9/54* (2006.01)
*G06K 9/60* (2006.01)

(52) U.S. Cl. ...................... 382/304; 382/302; 382/307; 345/656; 345/667; 345/682; 700/4; 700/5

(58) Field of Classification Search ........ 382/302–305, 382/307; 345/424, 643, 645, 656, 667, 682; 345/589; 700/2–5, 9
See application file for complete search history.

(56) References Cited

U.S. PATENT DOCUMENTS 5,751,928 A    5/1998   Bakalash ..................... 345/424
6,088,037 A *  7/2000   Fukunaga et al. .......... 345/589

FOREIGN PATENT DOCUMENTS

| JP | A 3-48979 | 3/1991 |
| JP | 10-240202 | 9/1998 |
| WO | WO 00/04482 | 1/2000 |

* cited by examiner

*Primary Examiner*—Bhavesh M. Mehta
*Assistant Examiner*—John Strege
(74) *Attorney, Agent, or Firm*—Oliff & Berridge, PLC

(57) ABSTRACT

The image-processing apparatus includes n image processing sections which receive n consecutive pixel data items that are respectively input with the same timing and which respectively process the respective input pixel data items with the same timing, and a control section that controls the n image processing sections. Each of the image processing sections are capable of being set to one of a first operation mode allowing data communication with the controlling section and a second operation mode allowing only reception from the aforementioned controlling section, one of the image processing sections is set to the first operation mode, and n−1 of the image processing sections are set to the second operation mode. Commands are commonly given to the n image processing sections from the controlling section; and when a command is given from the controlling section to the one of the image processing sections that is set to the first operation mode, the n image processing sections individually execute the same processing with the same timing.

13 Claims, 7 Drawing Sheets

(A)

(B)

IMAGE-PROCESSING APPARATUS AND IMAGE-DISPLAYING APPARATUS

BACKGROUND OF THE INVENTION

1. Field of the Invention

The present invention relates to an image-processing apparatus and an image-displaying apparatus using the same.

2. Background of the Related Art

Electronic apparatuses of various types that handle image signals representing images have been developed. The electronic apparatuses include, for example, direct-view-type displaying apparatuses and projection-type displaying apparatuses. Generally, these electronic apparatuses are configured by combining a plurality of image processing sections that individually control different functions.

With the advance of technology for allowing the aforementioned electronic apparatuses to be capable of handling high-resolution images, processing speeds of the individual image processing sections that configure these electronic apparatus are also required to be higher. Therefore, to meet the requirements, it is preferable that the individual image processing sections be developed so as to operate at a high speed. A method for improving the processing speeds is such that pieces of image data that are processed sequentially in units of one pixel are grouped in parallel corresponding to a plurality of the pixels for processing.

However, image-processing sections used in an electronic apparatus include those that do not have functions for performing parallel processing for the plurality of pixels. In such a case, as an ordinary measure, an arrangement is made such that a plurality of image processing sections having the same functions is provided in parallel, and image data for one pixel is processed by each of the image processing sections with the same timing. This method allows processing to be performed in parallel for image data for the plurality of pixels.

SUMMARY OF THE INVENTION

Ordinarily, setting of the plurality of image processing sections in the parallel arrangement is carried out so that the individual image processing sections operate substantially in the same processing conditions. However, the setting of the processing conditions must be carried out so as to be unique. For this reason, in the configuration in which the image processing sections are arranged in parallel, a problem arises in that apparatus-setting processing is more complicated than in a configuration in which the image processing sections are not arranged in parallel.

The present invention is made to solve the problem described above, and an object thereof is to provide techniques such that, even in a case where a plurality of image processing sections having the same functions is provided in parallel, control performed by one control unit for processing in one of the image processing sections allows processing in other image processing sections to be concurrently controlled.

In order to solve a part of the above-described problems, an image-processing apparatus includes n image processing sections which receive n (n represents an integer equal to or larger than "2") consecutive pixel data items that are respectively input with the same timing and which respectively process the respective input pixel data items with the same timing; and a control section for controlling the n image processing sections, wherein each of the image processing sections is capable of being set to one of a first operation mode allowing data communication with the controlling section and a second operation mode allowing only reception from the aforementioned controlling section, one of the image processing sections is set to the first operation mode, and n−1 image processing sections are set to the second operation mode; commands are commonly given to the n image processing sections from the controlling section; and when a command is given from the controlling section to the one of the image processing sections that is set to the first operation mode, the n image processing sections respectively execute the same processing with the same timing.

When the command is given from the control section to the image processing section set to the first operation mode, the command is also given to other image processing sections that are set to the second operation mode; and thereby, the image-processing apparatus of the present invention can control processing performed by other image processing sections. That is, even in a case where a plurality of image processing sections each having the same function are provided in parallel, when one controlling section controls processing performed by one of the image processing sections, processing performed by other image processing sections can concurrently be controlled.

In the image-processing apparatus, it is preferable that the n image processing sections be allocated in the same address space in address spaces that can be controlled by the controlling section.

According to the above arrangement, when a command is given by the controlling section to the image processing section set to the first operation mode, the command can be given to other image processing sections set to the second operation mode.

In the above image-processing apparatus, each of the image processing sections includes a mode-setting terminal for setting one of the first operation mode and the second operation mode, and one of the operation modes is set according to a mode-setting signal input to the mode-setting terminal.

The above image-processing apparatus may comprise a memory for storing image-processing data commonly used by the respective image processing sections, wherein the image processing section set to the first operation mode can write the image-processing data, which is fed from the controlling section, to the memory, and in addition, can read out the image-processing data written in the memory; and the image processing section set to the second operation mode can input the image-processing data read out by the image processing section set to the first operation mode from the memory.

In this case, the image-processing data is written to the memory by the image processing section set to the first operation mode, and the image-processing data read out by the image processing section, which is set to the first operation mode, from the memory can be input to all the image processing sections.

An image-displaying apparatus can be configured of the image-processing apparatus and an image-displaying section for displaying images represented by video signals output from the image-processing apparatus.

DETAILED DESCRIPTION OF THE PREFERRED EMBODIMENTS

A. First Embodiment

Figure 1:
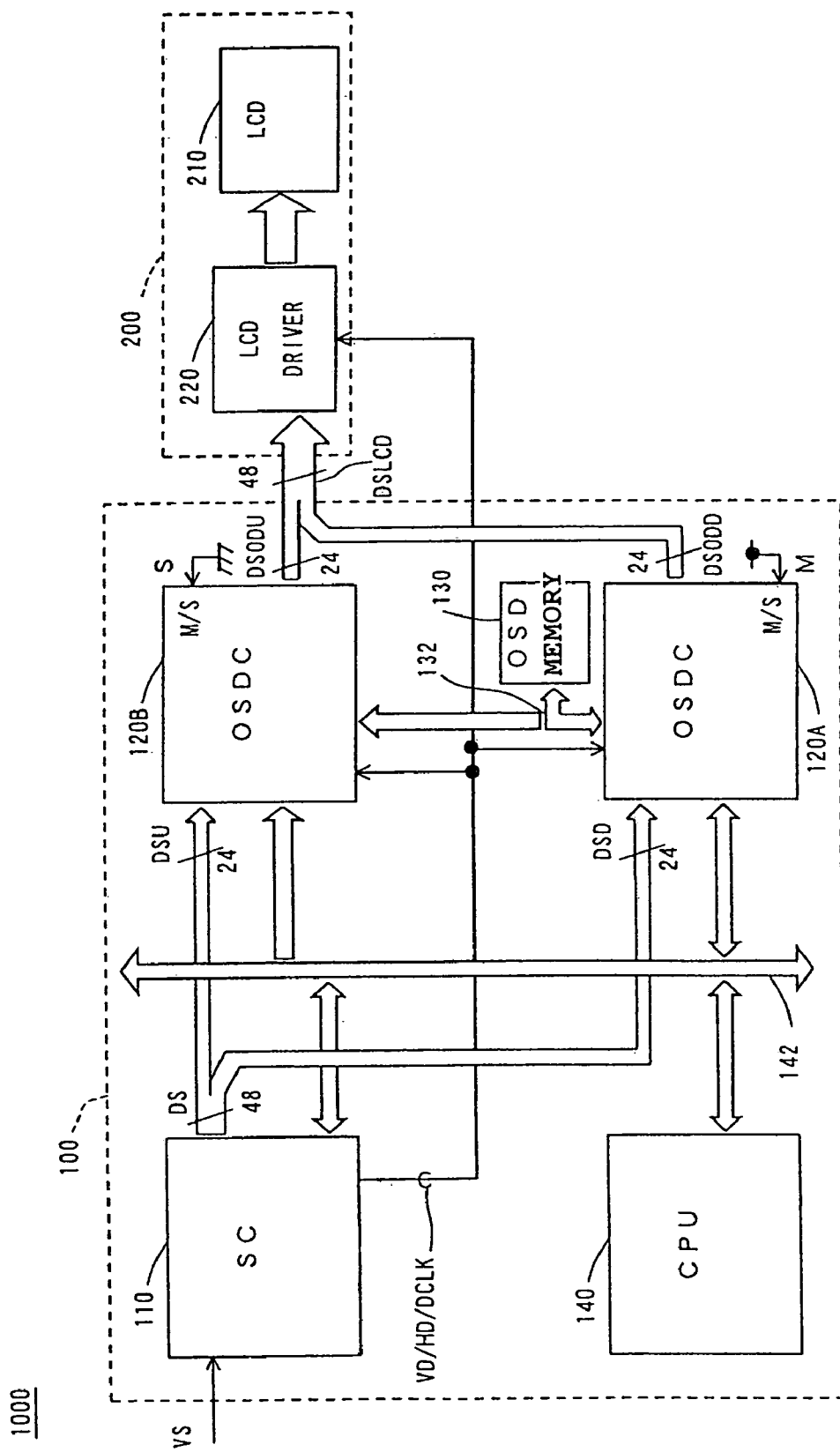
FIG. 1 is a block diagram showing an outline configuration of an image-displaying apparatus to which an image-processing apparatus as a first embodiment of the present invention is applied.

FIG. 1 is a block diagram showing an outline configuration of an image-displaying apparatus that includes an image-processing apparatus in accordance with a first embodiment of the present invention. An image-displaying apparatus 1000 includes an image-processing apparatus 100 and an image-displaying section 200. The image-processing apparatus 100 is a computer system that includes a scan converter 110 (which is simply referred to as an "SC", hereinbelow), two on-screen display controllers 120A and 120B (each of which is simply referred to as an "OSDC", hereinbelow), an OSD memory 130, and a CPU 140. The image-displaying section 200 includes a liquid crystal panel 210 and a panel-driving section 220. The image-processing apparatus 100 processes images to be formed on the liquid crystal panel 210. The invention also covers a configuration wherein the panel-driving section 220 is provided in the image-processing apparatus 100.

The CPU 140 is connected to the SC 110 and the two OSDCs 120A and 120B via a CPU bus 142. The CPU 140 sets processing conditions of respective sections and directly controls processing performed in the respective sections. The OSD memory 130 is connected to the first and second OSDCs 120A and 120B via a memory bus 132.

The SC 110 outputs vertically-synchronous signals VD, horizontally-synchronous signals HD, and clock signals DCLK that are used to display images on the image-displaying section 200. In addition, it outputs input-video signals VS to the image-displaying section 200 as video signals DS that can be input to the image-displaying section 200. Image data that is output as the video signals DS has the data width of 48 bits. Specifically, image data of 24 bits per pixel is concurrently output for two consecutive pixels. The image data for one pixel is made of 8-bit color data for each of the colors red, green, and blue. Video signals DSD for the lower 24 bits are input to the first OSDC 120A, whereas video signals DSU for the upper 24 bits are input to the second OSDC 120B. Hereinbelow, the image data included in the video signals DS may be referred to as the image data DS for the convenience of description. Image data DSD for the lower 24 bits corresponds to odd-number-pixel image data, whereas the image data DSU for the upper 24 bits corresponds to even-number-pixel image data. However, the above may be reverse.

The first and second OSDCs 120A and 120B are image processing sections that each display embellishment images, such as pointer images, and menu screens in images that are displayed in the image-displaying section 200. These first and second OSDCs 120A and 120B correspond to the image processing sections of the present invention. In the OSD memory 130, graphic data and font data that compose image data for pointer images and menu screens are stored in predetermined formats.

Figure 2:
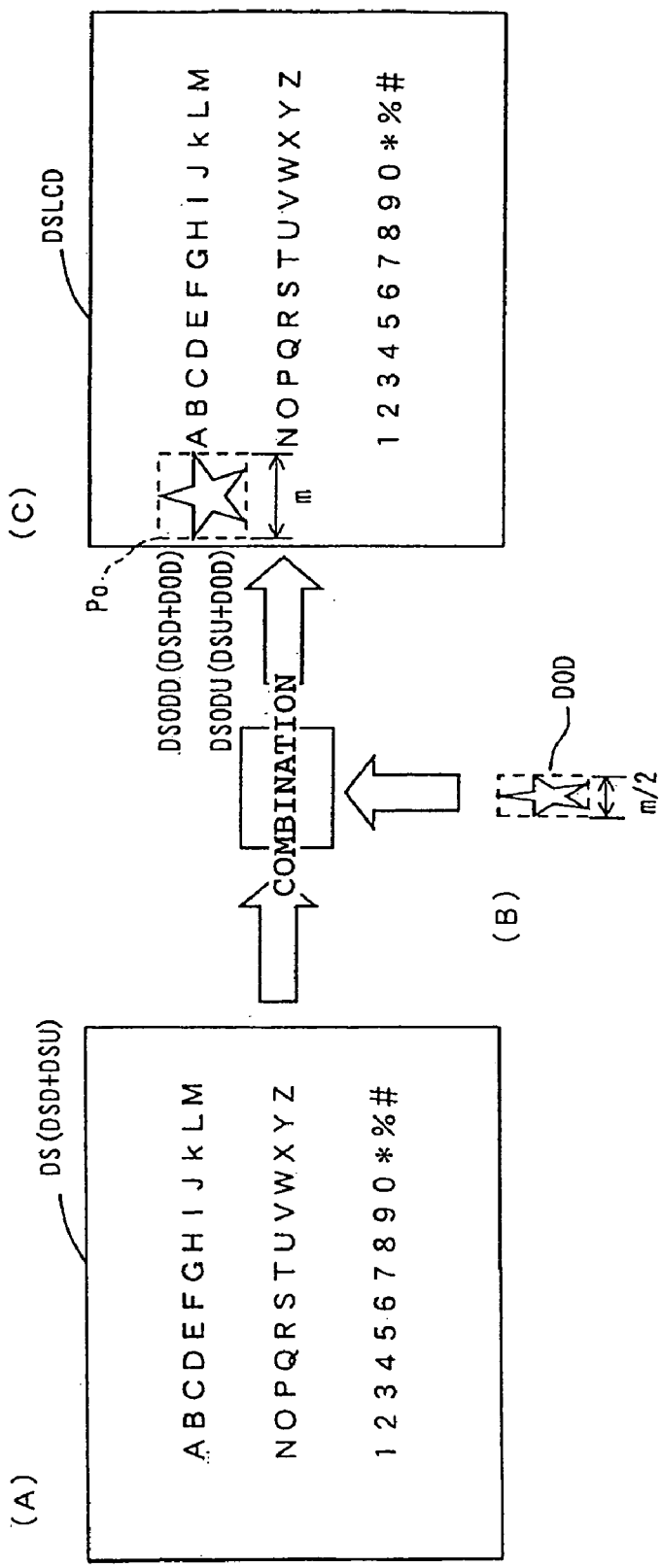
FIGS. 2(A)–2(C) illustrate processing to be performed by first and second OSDCs 120A and 120B.

FIGS. 2(A)–2(C) illustrate processing to be performed by the first and second OSDCs 120A and 120B. In synchronization with the vertically-synchronous signal VD, the clock signal DCLK, and the horizontally-synchronous signal HD, the first OSDC 120A expands the image data read out from the OSD memory 130 so as to be bitmap data, and OSD image data DOD as shown in FIG. 2(B) is thereby generated. The OSD image data DOD thus generated is combined with the odd-number-pixel image data DSD included in image data DS as shown in FIG. 2(A), and combined odd-number-pixel image data DSODD is thereby output.

The second OSDC 120B also operates with the same timing as in the case of the first OSDC 120A in synchronization with the vertically-synchronous signal VD, the horizontally-synchronous signal HD, and the clock signal DCLK. Specifically, the image data read out from the OSD memory 130 is expanded so as to be bitmap data, and OSD image data DOD as shown in FIG. 2(B) is thereby generated. The OSD image data DOD thus generated is combined with the even-number-pixel image data DSU included in the image data DS shown in FIG. 2(A), and combined even-number-pixel image data DSODU is thereby output.

The 24-bit combined image data DSODD and DSODU that have been output from the first and second OSDCs 120A and 120B, respectively, is fed as 48-bit display image data DSLCD to the panel-driving section 220 shown in FIG. 1. The vertically-synchronous signals VD, the horizontally-synchronous signals HD, and the clock signals DCLK that are output from the SC 110 are also fed to the panel-driving section 220. The liquid crystal panel 210 displays an image corresponding to the aforementioned display image data DSLCD. According to the above, as shown in FIG. 2(C), an OSD image is displayed in a position P0.

As described above, with the image-displaying apparatus 1000, display images represented by the input-video signals VS can be displayed. Also, OSD images, such as menu screens and embellishment images, generated by the first and second OSCDs 120, can be combined with an input image, and the combined images can thereby be displayed.

Figure 3:
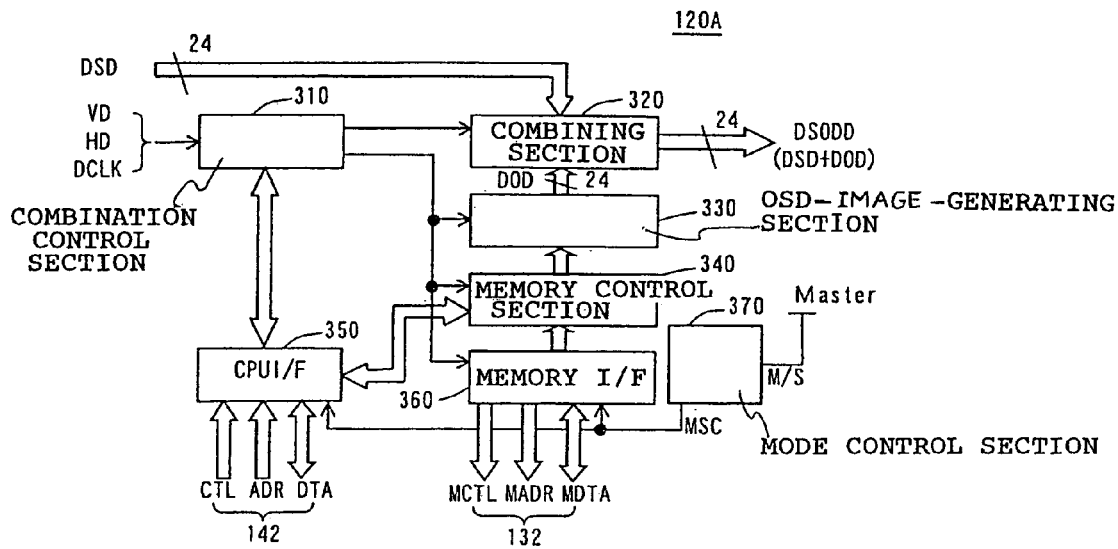
FIG. 3 is an outline block diagram showing an interior configuration of the first OSDC 120A.

FIG. 3 is an outline block diagram showing an interior configuration of the first OSDC 120A. The first OSDC 120A includes a combination control section 310, a combining section 320, an OSD-image-generating section 330, a memory control section 340, a CPU I/F section 350, a memory I/F section 360, and a mode control section 370. The CPU I/F section 350 is connected to a CPU address bus ADR, a CPU data bus DTA, and a CPU control bus CTL that constitute the CPU bus 142 (FIG. 1). The memory I/F section 360 is connected to a memory address bus MADR, a memory data bus MDTA, and a memory control bus MCTL that constitute the memory bus 132 of the OSD memory 130 (FIG. 1).

A master/slave-setting terminal M/S of the mode control section 370 is set to an H level, and an operation mode of the first OSDC 120A is thereby set to a master mode. The mode control section 370 outputs mode control signals MSC corresponding to the master mode, and thereby controls input/output conditions for the CPU I/F section 350 and the memory I/F section 360.

In a state where the operation mode is set to the master mode, the CPU I/F section 350 is controlled so as to permit input access and/or output access to the data bus DTA. The memory I/F section 360 is controlled so as to permit address data and control data to be output to the memory address bus MADR and the memory control bus MCTL, respectively, and so as to permit writing access and/or reading access to the OSD memory 130.

In the combination control section 310, combination control data representing the display position P0 of the OSD image (refer to FIG. 2) is set by the CPU 140 via the CPU I/F section 350. Also, the vertically-synchronous signals VD, the horizontally-synchronous signals HD, and the clock signals DCLK are input therein. The combination control section 310 controls the memory control section 340, the OSD-image-generating section 330, and the combining section 320 according to the combination control data, the synchronous signals HD and VD, and the clock signals DCLK that have been set.

According to a request issued from the CPU 140, the memory control section 340 controls writing to the OSD memory 130 and reading therefrom via the memory I/F section 360. Also, according to a control signal output from the combination control section 310, via the memory I/F section 360, the memory control section 340 controls reading of image-processing data from the OSD memory 130, image-processing data being used when the OSD-image-generating section 330 generates OSD image data DOD.

The OSD-image-generating section 330 outputs 24-bit OSD image data DOD according to image-processing data read out by the memory control section 340 from the OSD memory 130.

The combining section 320 combines the odd-number-pixel image data DSD output from the SC 110 with the OSD image data DOD, and thereby generates combined odd-number-pixel image data DSODD.

Figure 4:
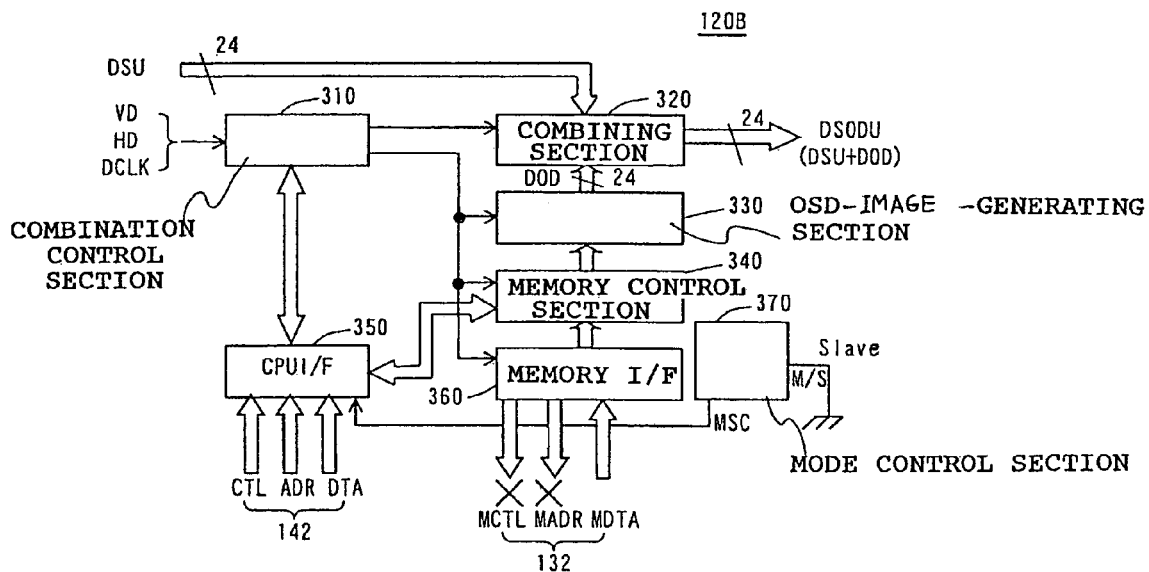
FIG. 4 is an outline block diagram showing an interior configuration of the second OSDC 120B.

FIG. 4 is an outline block diagram showing an interior configuration of the second OSDC 120B. The second OSDC 120B is the same as the first OSDC 120A except that the master/slave-setting terminal M/S of the mode control section 370 is set to an L level, and the operation mode is set to a slave mode.

As shown in FIG. 4, when the operation mode is set to the slave mode, the CPU I/F section 350 is controlled so as to be inhibited from outputting data to the data bus DTA and so as to be permitted only to input data thereto. The mode control section 370 is controlled so as to be inhibited from outputting individual data to a memory address bus MADR, a memory data bus MDTA, and a memory control bus MCTL. As described, however, since a memory control section 340 is set with the same control data as in the case of the memory control section 340 in the first OSDC 120A, it operates with the same timing as in the master mode. Therefore, the second OSDC 120B operating in the slave mode can concurrently retrieve the image-processing data that the first OSDC 120A operating in the master mode has read out from the OSD memory 130.

Figure 5:
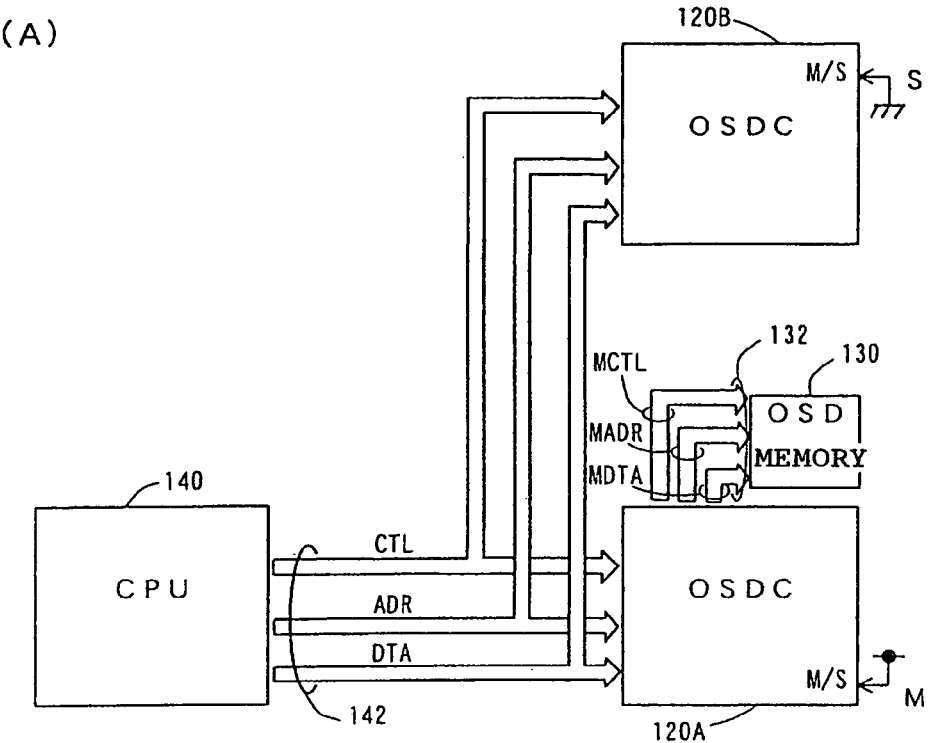
FIGS. 5(A) and 5(B) show operation performed between the first and second OSDCs 120A and 120B and a CPU 140.
Figure 5:
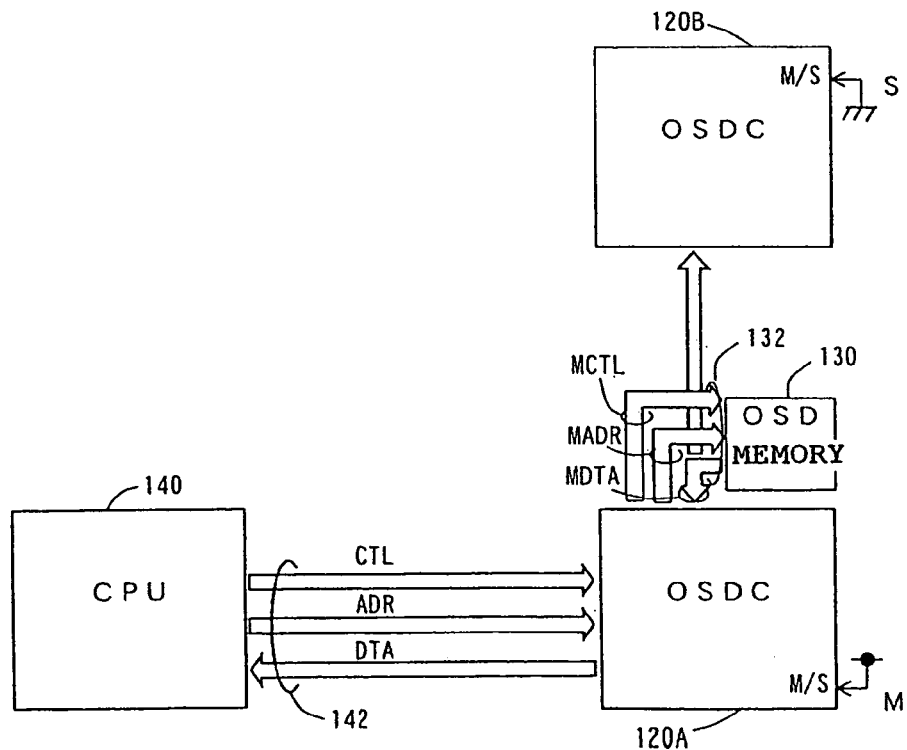
Figure 6:
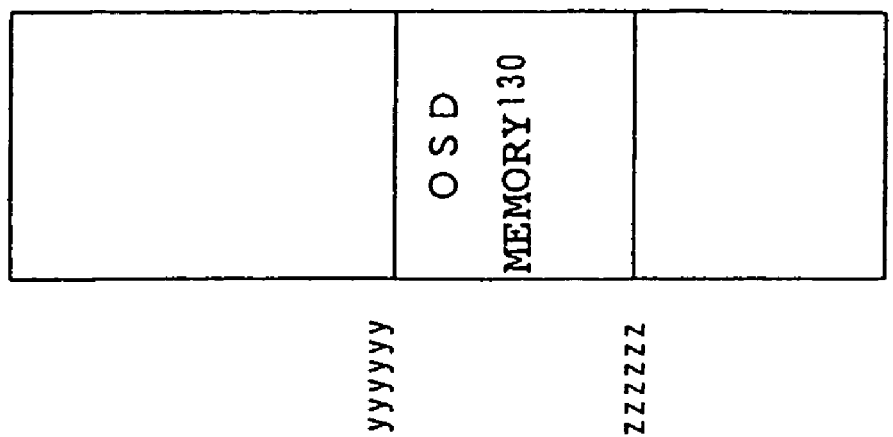
FIGS. 6(A) and 6(B) show an I/O address space and a memory space in the CPU 140.
Figure 6:
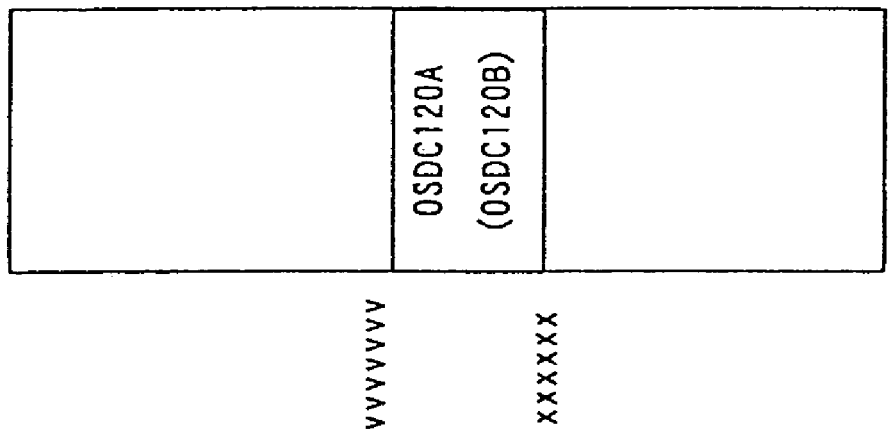

FIGS. 5(A) and 5(B) show operation performed among the first and second OSDCs 120A and 120B and the CPU 140. FIGS. 6(A) and 6(B) show an I/O address space and a memory space in the CPU 140. As shown in FIG. 6(A), only an address space for a single OSDC is allocated in the I/O address space in the CPU 140, and the same I/O address is allocated for the two OSDCs 120A and 120B. As described earlier, the first and second OSDCs 120A and 120B have completely the same internal functions except that the different operation modes are set. Therefore, when the CPU 140 requests the first OSDC 120A to input (write) data, as shown in FIG. 5(A), the data is input to the first OSDC 120A, and concurrently, the same data is input to the second 120A, and concurrently, the same data is input to the second OSDC 120B from the CPU 140 via the CPU bus 142 (the CPU address bus ADR, the CPU data bus, and the CPU control bus CTL).

When the CPU 140 requests the first OSDC 120A to write image-processing data to the OSD memory 130, the data is input to both the first and second OSDCs 120A and 120B. As described in the above, however, since the second OSDC 120B set to the slave mode is inhibited from outputting the data to the OSD memory 130, writing of the data to the OSD memory 130 is executed only by the first OSDC 120A set to the master mode.

When the CPU 140 requests the first OSDC 120A to output (read) data, as described above, since the second OSDC 120B set to the slave mode is inhibited from outputting data to the CPU 140, as described in FIG. 5(B), the data is output only from the first OSDC 120A set to the master mode. When the CPU 140 issues a request thereto for reading of image-processing data written in the OSD memory 130, image-processing data read from the OSD memory 130 can be input to both the first and second OSDCs 120A and 120B. However, similarly to the above case, output of the data to the CPU 140 is executed only by the first OSDC 120A. In this case, the memory control section 340 in the second OSDC 120B set to the slave mode may be controlled so as to stop its operation.

Figure 7:
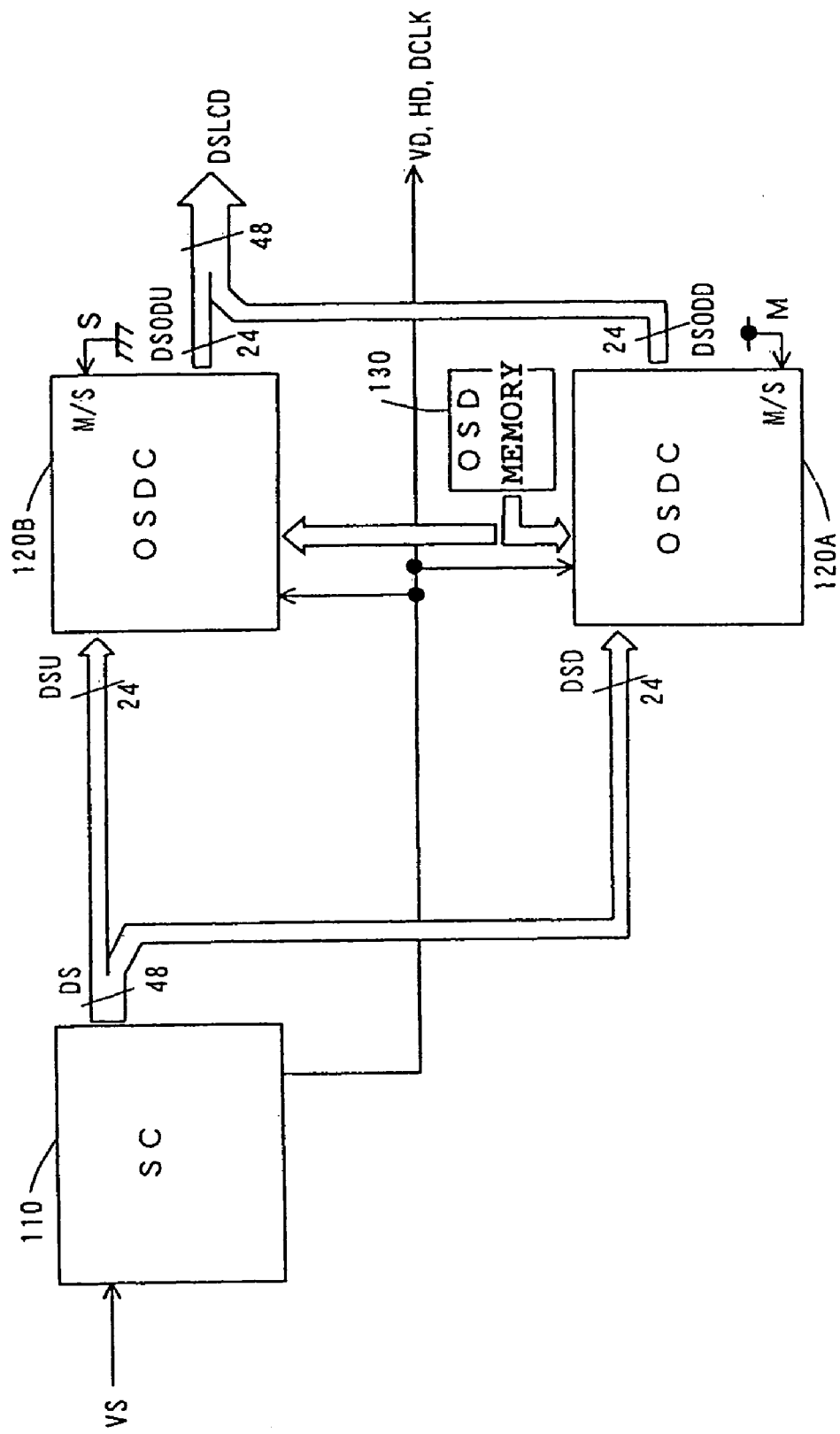
FIG. 7 is an explanatory drawing showing operation that is performed to display OSD images generated by the first and second OSDCs 120A and 120B.

FIG. 7 is an explanatory drawing showing operation that is performed to display the OSD images generated by the first and second OSDCs 120A and 120B. To display the OSD images, in the first OSDC 120A, the OSD image data DOD generated in the OSD-image-generating section 330 according to the image-processing data read out from the OSD memory 130 is combined with the image data DSD in the combining section 320 (FIG. 3). Therefore, combined odd-number-pixel image data DSODD is output from the first OSDC 120A. On the other hand, in the second OSDC 120B, image data read by the first OSDC 120A is concurrently retrieved, and even-number-pixel image data DSODU is output in the same way as that in the first OSDC 120A. As a result of the above, the image data DS output from the SC 110 is combined with OSD image data DOD in the first and second 120A and 120B with the same timing on the basis of the odd-numbered pixel and the even-numbered pixel. Accordingly, the image data for the two continuous pixels is processed in parallel and is thereby output as the display image data DSLCD.

As described above, each of the first and second OSDCs 120A and 120B can be operated in one of the master mode and the slave mode. At this time, when the CPU 140 issue a request for input and/or output of data to the first OSDC 120A set to the master mode, the same data can be output to the second OSDC 120B set to the slave mode. That is, while the two first and second OSDCs 120A and 120B operate with the same timing, the CPU 140 controls the first OSDC 120A operating in the master mode, thereby allowing the second OSDC 120B operating in the slave mode to be concurrently controlled.

The OSD image data to be generated in the OSD-image-generating section 330 is preferably generated as follows. According to the image-displaying apparatus 1000, in the image data DS representing the image as shown in FIG. 2(A), the odd-number-pixel image data DSD is combined with the OSD image data DOD as shown in FIG. 2(B) in the first OSDC 120A, and concurrently, the even-number-pixel image data DSU is combined with the OSD image data DOD in the second OSDC 120B, thereby generating the display image data DSLCD that represents pixels as shown in FIG. 2(C). Thus, pieces of the OSD image data DOD generated with the same timing in the individual first and second OSDCs 120A and 120B are the same data. Therefore, to display the OSD image having m pixels in the horizontal direction, as shown in an area surrounded by a broken line in FIG. 2(C), the OSD image data to be combined with the even-number-pixel image data is preferably data that has m/2 of pixels in the horizontal direction, as shown in FIG. 2(B).

In the image-displaying apparatus 1000, the OSD memory 130 is shared such that reading and/or writing access to the OSD memory 130 is controlled by the first OSDC 120A set to the master mode, and only the data read out by the first OSDC 120A is permitted to be used in the second OSDC 120B set to the slave mode. However, the OSD memory 130 may be provided in each of the first and second OSDCs 120A and 120B. In this case, an arrangement may be such that control in the slave mode for the memory I/F section 360 in the second OSDC 120B is cancelled, and control is then executed by the memory control section 340 for writing access and/or reading access to the OSD memory 130 connected to the second OSDC 120B. As a result, writing and/or reading of data is executed by the individual first and second OSDCs 120A and 120B with the same timing for the individual OSD memories 130.

B. Second Embodiment

Figure 8:
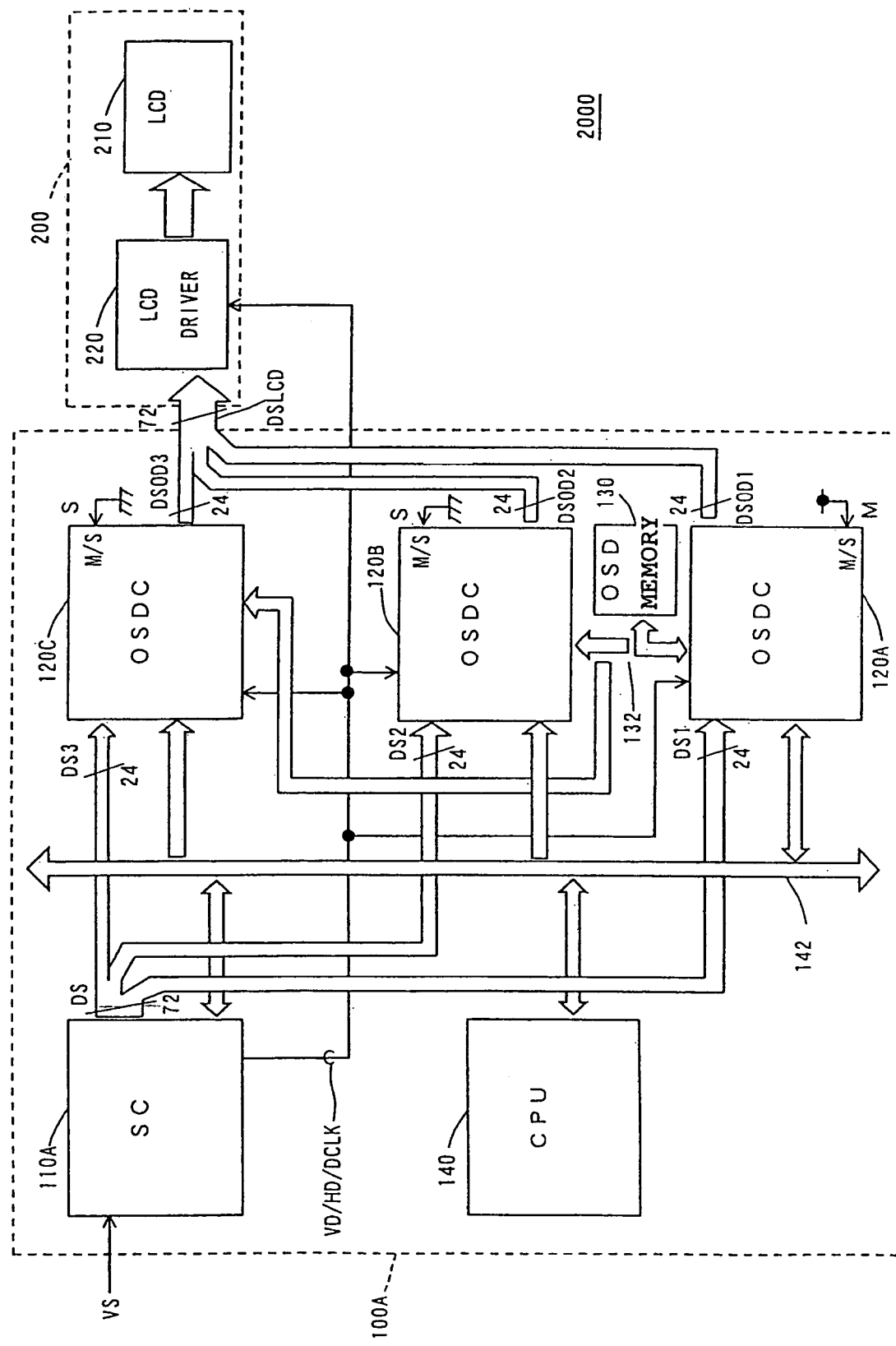
FIG. 8 is a block diagram showing an outline configuration of an image-displaying apparatus to which an image-processing apparatus as a second embodiment of the present invention is applied.

FIG. 8 is a block diagram showing an outline configuration of an image-displaying apparatus to which an image-processing apparatus as a second embodiment of the present invention is applied. An image-displaying apparatus 2000 includes an image-processing apparatus 100A and three OSDCs 120A, 120B, and 120C. An SC 110A outputs 72-bit image data DS including image data for three consecutive pixels, and individual items of the output image data are input to the three 120A, 120B, and 120C in the unit of one pixel.

The first OSDC 120A is set to the master mode, and the second and third OSDCs 120B and 120C are set to the slave mode. According to this arrangement, also in the second embodiment, when a CPU 140 requests the first OSDC 120A, which is set to the master mode, to input and/or output data, the same data can be output to the second and third OSDCs 120B and 120C, which are set to the slave mode. That is, among the 120A, 120B, and 120C that operate with the same timing, the CPU 140 controls the first OSDC 120A that operates in the master mode, thereby allowing the second and third OSDCs 120B and 120C, which operate in the slave mode, to be concurrently controlled.

In this case, as OSD image data that is combined in each of the three 120A, 120B, and 120C, when image data to be displayed represents m pixels in the horizontal direction, the image data preferably represents m/3 of the pixels in the horizontal direction.

As will be understandable from the above description, generally, an arrangement may be such that the n on-screen display controllers are provided in parallel, one of the on-screen display controllers is set to the master mode, and n−1 of the on-screen display controllers are set to the slave mode.

The present invention is not restricted to the above-described examples and embodiments, and the invention may be implemented in various modes without departing from the scope of the invention. A few exemplary modifications are described below. However the invention is not restricted by the following exemplary modifications.

(1) In the above-described embodiments, the description has been given of the case where the liquid crystal panel 210 is used in the image-displaying section 200. However, the invention is not restricted thereto, and it may be applied to a case where various display devices, such as a plasma display and a CRT, are provided.

(2) In the above-described embodiments, the description has been given with reference to the direct-view type image-displaying section 200 as the example. However, it may also be a projection-type displaying apparatus using a projection optical system for projecting images.

(3) In the above-described embodiments, the description has been given of exemplary structures that include the plurality of on-screen display controllers arranged in parallel. However, the present invention is not restricted thereto. For example, the invention may be applied to a case where a plurality of various types of image processing sections that perform various types of processing for video signals, such as an image-magnification/reduction processing section and a color-signal-level correcting section, are provided in parallel. Also, in the above-described embodiments, the description has been given of the example image-processing apparatus applied to the image-displaying apparatus. However, the invention is not restricted thereto, and it may be applied to a variety of image-processing apparatuses provided in electronic apparatuses that handle various types of images.

The present invention can be used for image-processing apparatuses and image-displaying apparatuses using the image-processing apparatus.

What is claimed is:

1. An image-processing apparatus, comprising:
   n image processing sections which receive n consecutive pixel data items that are respectively input with the same timing and which respectively process the respective input pixel data items with the same timing, n representing an integer equal to at least "2"; and
   a control section that controls the n image processing sections;
   wherein each of the image processing sections are capable of being set to one of a first operation mode allowing data communication with the control section, and a second operation mode allowing only reception from the control section, one of the image processing sections is set to the first operation mode, and n−1 of the image processing sections are set to the second operation mode;
   wherein commands are commonly given to the n image processing sections from the control section; and
   wherein, when a command is given from the control section to the one of the image processing sections that is set to the first operation mode, the n image processing sections individually execute the same processing with the same timing; the image-processing apparatus further including a memory that stores image-processing data commonly used by the respective image processing sections, wherein the image processing section set to the first operation mode can write the image-processing data, which is fed from the control section, to the memory, and in addition, can read out the image-processing data written in the memory; and wherein the image processing section set to the second operation mode can input the image-processing data read out by the image processing section set to the first operation mode from the memory.

2. The image-processing apparatus according to claim 1, the n image processing sections being allocated in the same address space in address spaces that can be controlled by the control section.

3. The image-processing apparatus according to claim 1, each of the image processing sections including a mode-setting terminal that sets one of the first operation mode and the second operation mode, and one of the operation modes being set according to a mode-setting signal input to the mode-setting terminal.

4. The image-processing apparatus according to claim 1, further including a memory that stores image-processing data commonly used by the respective image processing sections,
wherein the image processing section set to the first operation mode can write the image-processing data, which is fed from the control section, to the memory, and in addition, can read out the image-processing data written in the memory; and
wherein the image processing section set to the second operation mode can input the image-processing data read out by the image processing section set to the first operation mode from the memory.

5. An image-displaying apparatus, comprising:
the image-processing apparatus according to claim 1, and
an image-displaying section that displays images represented by video signals output from the image-processing apparatus.

6. The image-processing apparatus according to claim 2, each of the image processing sections including a mode-setting terminal that sets one of the first operation mode and the second operation mode, and one of the operation modes being set according to a mode-setting signal input to the mode-setting terminal.

7. The image-processing apparatus according to claim 3, further including a memory that stores image-processing data commonly used by the respective image processing sections,
wherein the image processing section set to the first operation mode can write the image-processing data, which is fed from the control section, to the memory, and in addition, can read out the image-processing data written in the memory; and
wherein the image processing section set to the second operation mode can input the image-processing data read out by the image processing section set to the first operation mode from the memory.

8. An image-displaying apparatus, comprising:
the image-processing apparatus according to claim 2, and
an image displaying section that displays images represented by video signals output from the image-processing apparatus.

9. An image-displaying apparatus, comprising:
the image-processing apparatus according to claim 3, and
an image displaying section that displays images represented by video signals output from the image-processing apparatus.

10. An image-displaying apparatus, comprising:
the image-processing apparatus according to claim 4, and
an image displaying section that displays images represented by video signals output from the image-processing apparatus.

11. An image-processing apparatus according to claim 1, further comprising:
a CPU data bus,
the image processing section that is set to the first operation mode is permitted input access and/or output access to the CPU data bus, and the image processing sections that are set to the second operation mode are inhibited from outputting data to the CPU data bus.

12. An image-processing apparatus according to claim 1, each of the image processing sections including a mode control section that sets to one of the first operations mode and the second operation mode.

13. The image-processing apparatus according to claim 1, further comprising:
a scan converter that outputs synchronization signals as a basis for the same timing.

* * * * *